US009108218B2

(12) United States Patent
Oliver et al.

(10) Patent No.: US 9,108,218 B2
(45) Date of Patent: Aug. 18, 2015

(54) SYSTEM AND METHOD FOR MAKING MULTILAYER FILMS AND A LAYER MULTIPLICATION DEVICE

(71) Applicant: Nordson Extrusion Dies Industries, LLC, Chippewa Falls, WI (US)

(72) Inventors: Gary D. Oliver, Broomfield, CO (US); Dale P. Pitsch, Jim Falls, WI (US); Michael K. Truscott, Chippewa Falls, WI (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 13/796,696

(22) Filed: Mar. 12, 2013

(65) Prior Publication Data

US 2013/0276895 A1 Oct. 24, 2013

Related U.S. Application Data

(60) Provisional application No. 61/635,830, filed on Apr. 19, 2012.

(51) Int. Cl.
*B29C 47/70* (2006.01)
*B05D 5/06* (2006.01)
(Continued)

(52) U.S. Cl.
CPC ............... *B05D 5/06* (2013.01); *B29C 47/061* (2013.01); *B29C 47/065* (2013.01); *B29C 47/56* (2013.01); *B29C 47/705* (2013.01); *B29C 47/707* (2013.01); *B29C 47/0021* (2013.01); *B29C 47/0832* (2013.01); *B29C 2947/926* (2013.01);
(Continued)

(58) Field of Classification Search
CPC .... B29C 47/06; B29C 47/062; B29C 47/065; B29C 47/145; B29C 47/0021; B29C 47/061; B29C 47/0832; B29C 47/56; B29C 47/705; B29C 47/707
USPC ........................ 425/131.1, 133.5, 192 R, 462
See application file for complete search history.

(56) References Cited

U.S. PATENT DOCUMENTS 3,195,865 A 7/1965 Harder
3,239,197 A 3/1966 Toller
(Continued)

FOREIGN PATENT DOCUMENTS

CN 101 987 449 3/2011
JP 2006 326891 12/2006

OTHER PUBLICATIONS

European Search Report dated Aug. 27, 2013 for European Application No. 13161274.9, 10 pages.

*Primary Examiner* — Yogendra Gupta
*Assistant Examiner* — Joseph Leyson
(74) *Attorney, Agent, or Firm* — Fredrikson & Byron, P.A.

(57) ABSTRACT

A layer multiplication device may include a housing and at least one layer multiplication insert positioned inside the housing. The housing may have an inlet configured to receive a flow stream, an outlet configured to discharge the flow stream, and a flow cavity extending between the inlet and the outlet. In operation, the layer multiplication insert may divide an incoming flow stream so as to multiply the flow stream into at least a first flow stream and a second flow stream. In some examples, the inlet provides an inlet flow volume equal to a cross-sectional area of the housing at the inlet multiplied by a length of the flow cavity, the flow cavity defines a cavity flow volume, and the cavity flow volume is equal to or greater than the inlet flow volume.

11 Claims, 6 Drawing Sheets

(51) Int. Cl.
  B29C 47/06 (2006.01)
  B29C 47/56 (2006.01)
  B29C 47/00 (2006.01)
  B29C 47/08 (2006.01)

(52) U.S. Cl.
  CPC .............. *B29C 2947/92104* (2013.01); *B29C 2947/92161* (2013.01); *B29C 2947/92657* (2013.01)

(56) References Cited

U.S. PATENT DOCUMENTS

| | | | |
|---|---|---|---|
| 3,328,003 A | 6/1967 | Chisholm | |
| 3,557,265 A | 1/1971 | Chisholm et al. | |
| 3,687,589 A | 8/1972 | Schrenk | |
| 3,759,647 A | 9/1973 | Schrenk et al. | |
| 3,924,990 A | 12/1975 | Schrenk | |
| 3,963,221 A * | 6/1976 | Yi | 366/341 |
| 4,600,550 A | 7/1986 | Clören | |
| 4,906,171 A | 3/1990 | Miller | |
| 5,094,788 A | 3/1992 | Schrenk et al. | |
| 5,094,793 A | 3/1992 | Schrenk et al. | |
| 5,202,074 A | 4/1993 | Schrenk et al. | |
| 5,269,995 A | 12/1993 | Ramanathan et al. | |
| 5,316,703 A | 5/1994 | Schrenk | |
| 5,380,479 A | 1/1995 | Schrenk et al. | |
| 5,389,324 A | 2/1995 | Lewis et al. | |
| 5,540,878 A | 7/1996 | Schrenk et al. | |
| 5,628,950 A | 5/1997 | Schrenk et al. | |
| 6,808,658 B2 | 10/2004 | Stover | |
| 6,830,713 B2 | 12/2004 | Hebrink et al. | |
| 6,905,324 B2 | 6/2005 | Cloeren | |
| 8,215,940 B2 | 7/2012 | Winroth | |
| 2003/0201565 A1 | 10/2003 | Cloeren | |
| 2006/0055076 A1 | 3/2006 | Cloeren | |
| 2010/0239700 A1 | 9/2010 | Winroth | |
| 2011/0272849 A1 | 11/2011 | Neavin et al. | |

\* cited by examiner

SYSTEM AND METHOD FOR MAKING MULTILAYER FILMS AND A LAYER MULTIPLICATION DEVICE

This application claims the benefit of U.S. Provisional Patent Application No. 61/635,830, filed Apr. 19, 2012, the entire content of which is incorporated herein by reference.

TECHNICAL FIELD

This disclosure relates to a system and method for making multilayer films and, more particularly, to a layer multiplication device for forming a multilayer film.

BACKGROUND

Multilayer films that have alternating layers of polymeric materials are used in a variety of different industries and applications. In the packaging industry, for instance, multilayer films are used to package foods, beverages, and consumer products, among other items. The different layers of the multilayer film can act as a barrier to prevent the ingress and egress of moisture, oxygen, and other gases that can reduce the shelf life of the packaged product. As another example, multilayer films are used as optical films in computer monitors, windows, and other optical systems. The different layers of the multilayer film can have different optical properties, such as different indices of refraction, which control light transmission and display through the film.

The optical and physical properties of a multilayer film typically depends on a number of variables such as the type of polymeric materials used for the individual layers of the film, the overall number of individual layers in the film, and thickness of each individual layer in the film. For example, some multilayer films currently produced have dozens or even hundreds of individual layers, where each layer is only a few microns thick. Properly controlling the formation of these individual layers during the film manufacturing process can help ensure that the resultant multilayer film has the desired optical and/or physical properties.

A layer multiplication device, which is often referred to as a layer multiplier, is a device used during the film manufacturing process to multiply the number of individual layers in a film. The layer multiplication device may take a film that has two layers of different material stacked one on top of another, for example in an A-B configuration, and replicate the layer structure, for example, to produce a film that has an A-B-A-B layer configuration. The process of dividing and recombining layers within the layer multiplication device can generate shear forces and cause pressure drop across the device. If great enough, these shear forces can damage the physical structure of the multilayer film during manufacture and/or cause different layers of the film to blend together, preventing the formation of a well-defined multilayer film stack.

SUMMARY

In general, this disclosure relates to a system and method for taking a multilayer flow stream that has a plurality of layers and dividing the flow stream to multiply the flow stream, for example, into a first multilayer flow stream and a second multilayer flow stream, and a layer multiplication device. The divided flow streams are recombined by stacking the divided flow streams one on top of another to form a multiplied multilayer flow stream. The multiplied multilayer flow stream may have the same configuration of individual layers as the original multilayer flow stream. However, the configuration of individual layers may be repeated in a vertically stacked arrangement in the multiplied multilayer flow stream as compared to the original multilayer flow stream. For example, in instances where the original multilayer flow stream has an A-B-C stacked layer configuration, the multiplied multilayer flow stream may have an A-B-C-A-B-C stacked layer configuration. This would be a 2× multiplication of the original multilayer flow stream, although higher multiplications (e.g., 4×, 8×, 16×) are also possible.

The layer multiplication device includes an insert housing that has an inlet, an outlet, and a flow cavity extending between the inlet and the outlet. The layer multiplication device also includes a layer multiplication insert positioned within the flow cavity. During operation, the layer multiplication insert divides a flow stream entering the layer multiplication device into at least a first flow stream and a second flow stream, thereby multiplying the flow stream.

Depending on the configuration of the layer multiplication device, the device may be configured so that a cavity flow volume of the device is equal to or greater than an inlet flow volume of the device. In such examples, the cavity flow volume may be a free volume within the flow cavity of the insert housing through which a flow stream travels during operation. As used herein, the term "free volume" means the space within the insert housing not occupied by the layer multiplication insert (or inserts where there are multiple inserts). By contrast, the inlet flow volume is equivalent to a cross-sectional area of the insert housing at the inlet multiplied by a length of the flow cavity. To configure the layer multiplication device so that the cavity flow volume of the device is equal to or greater than an inlet flow volume, the insert housing may be enlarged in the region where the layer multiplication insert is positioned relative to the inlet of the housing. The enlarged region accounts for space within the insert housing occupied by the layer multiplication insert. Accordingly, as a flow stream moves through the layer multiplication device, the flow stream has at least as much volume within the device as at the inlet of the device (e.g., or a flow channel upstream of the device) even though the layer multiplication insert occupies space within the device. This configuration reduces the magnitude of shear forces generated in the device and pressure drop across the device, as compared to known layer multiplication devices which have a constricted flow cavity.

In one example according to the disclosure, a layer multiplication device is described that includes a housing and at least one layer multiplication insert. The housing has an inlet configured to receive a flow stream, an outlet configured to discharge the flow stream, and a flow cavity extending between said inlet and said outlet. According to the example, the at least one layer multiplication insert is positioned within the flow cavity and the layer multiplication insert is configured to divide the flow stream into at least a first flow stream and a second flow stream and recombine the first flow stream and the second flow stream by stacking the first flow stream on top of the second flow stream. The example further specifies that the inlet has an inlet flow volume equivalent to a cross-sectional area of the housing at the inlet multiplied by a length of the flow cavity and that the flow cavity has a cavity flow volume equal to or greater than the inlet flow volume.

In another example, a system is described that includes a feed block, a layer multiplication device, and a flow channel. The feed block configured to receive a plurality of polymeric flows and discharge a primary multilayer flow stream having a plurality of layers, each layer of the primary multilayer flow stream including one of the plurality of polymeric flows. The layer multiplication device including a housing and at least one layer multiplication insert positioned within said housing. The housing has an inlet configured to receive the primary multilayer flow stream, an outlet configured to discharge a multiplied multilayer flow stream, and a flow cavity extending between said inlet and said outlet. The layer multiplication insert is configured to divide the primary multilayer flow stream into at least a first multilayer flow stream and a second multilayer flow stream and recombine the first multilayer flow stream and the second multilayer flow stream by stacking the first multilayer flow stream on top of the second multilayer flow stream. In addition, the flow channel connects the feed block to the inlet of the housing. The example further specifies that the flow channel has a flow channel volume equal to a volume of space in the flow channel through which the primary multilayer flow stream travels per unit of length, the flow cavity of the housing has a cavity flow volume, and that the cavity flow volume is equal to or greater than the flow channel volume.

In another example, a method of multiplying a multilayer flow stream using a flow channel and a layer multiplication device with a flow cavity is described. The method includes conveying the primary multilayer flow stream through the flow channel, where the flow channel has a flow channel volume, and receiving the primary multilayer flow stream from the flow channel in the flow cavity which has a cavity flow volume equal to or greater than the flow channel volume. The method further includes dividing the primary multilayer flow stream into at least a first multilayer flow stream and a second multilayer flow stream, and recombining the first multilayer flow stream and the second multilayer flow stream inside the layer multiplication device by stacking the first multilayer flow stream on top of the second multilayer flow stream.

The details of one or more examples are set forth in the accompanying drawings and the description below. Other features, objects, and advantages will be apparent from the description and drawings, and from the claims.

DETAILED DESCRIPTION

Figure 1:
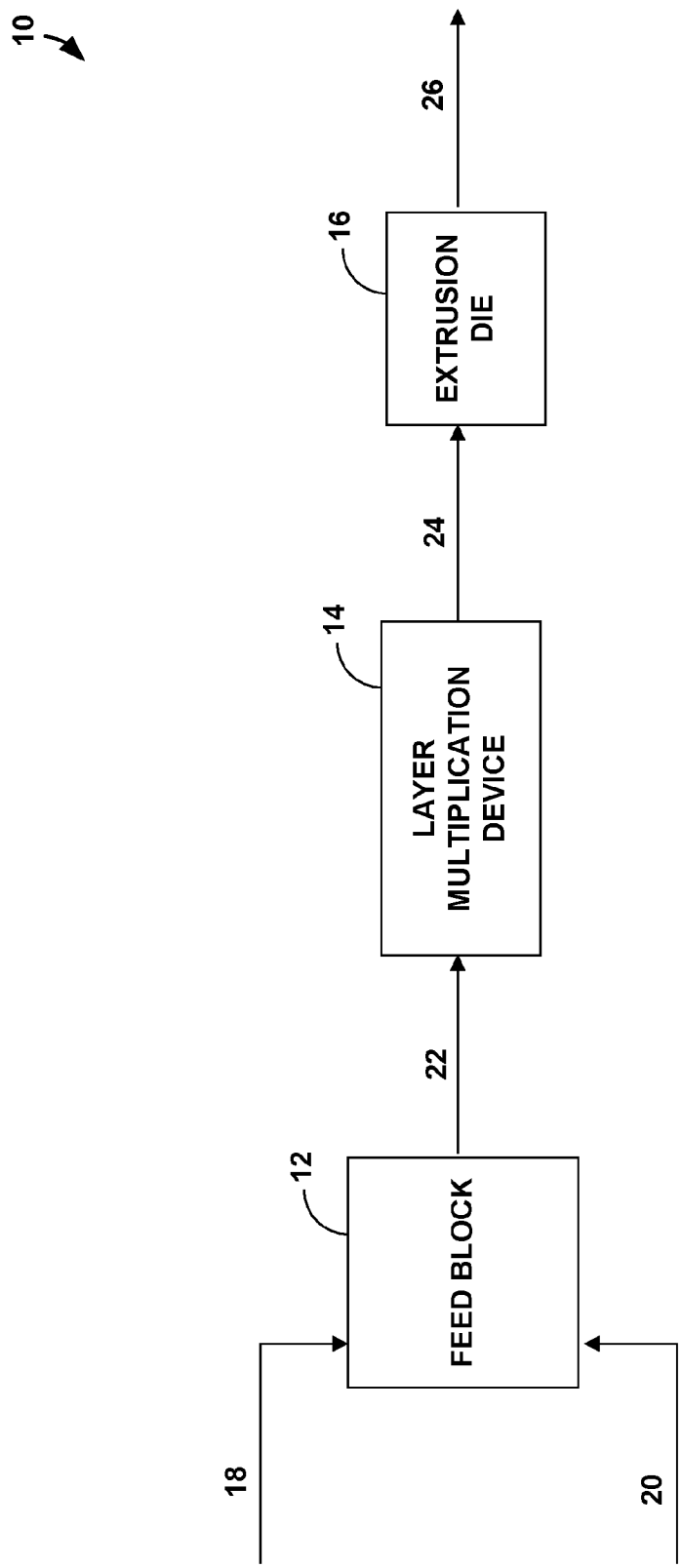
FIG. 1 is a conceptual drawing illustrating an example system, including an example layer multiplication device, that may be used to manufacture a multilayer film.

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A multilayer polymeric film may include a plurality of individual layers each formed of one or more types of polymeric materials. For example, a polymeric film may have dozens of even hundreds of individual layers formed from two, three, four, or more different types of polymeric materials. Depending on the specific manufacturing process, the multilayer polymeric film may be formed using a feed block that receives different polymeric materials and orients the polymeric materials to form a primary multilayer flow stream. After exiting the feed block, the primary multilayer flow stream flows through a flow channel for further processing on a film line to produce a finished multilayer film.

In applications where the number of individual polymeric layers required for a multilayer polymeric film exceeds the practical number of layers that can be generated directly by a feed block, a layer multiplication device is used to increase the number of layers in the primary multilayer flow. The layer multiplication device is positioned downstream of the feed block to receive the primary multilayer flow stream from the feed block. The layer multiplication device divides the primary multilayer flow stream into two or more secondary streams each having the same layer configuration (e.g., layer stack) as the primary multilayer flow stream. The layer multiplication device then reorients the two or more secondary streams by stacking one stream on top of another stream to generate a recombined multilayer flow stream that has an increased number of individual layers as compared to the primary multilayer flow stream. For example, when the layer multiplication device splits the primary multilayer flow stream into two secondary streams that are stacked on top of one another, the recombined flow stream has twice the number of individual layers as the primary multilayer flow stream.

When a primary multilayer flow stream moves through a known layer multiplication device, the mechanical action of dividing the flow stream and recombining divided secondary streams to form a recombined multilayer flow stream introduces shear stress to the flowing streams of material. For example, as the primary multilayer flow stream enters the layer multiplication device and contacts a layer multiplication insert in the device, the primary multilayer flow stream is divided into two streams that are forced into separate sections of the device that have a combined volume less than the volume occupied by the incoming primary multilayer flow stream. This may cause a pressure drop across the layer multiplication device, introducing shear stress to the flowing streams of material. If the shear stress is too great, the physical structure of the multilayer film may be damaged and/or different individual layers of the multilayer flow stream may blend together, which may cause at least a portion of the resulting film to lose its multilayer characteristics.

In accordance with the techniques described in some examples of this disclosure, a layer multiplication device is provided that is configured to multiply the number of layers in an incoming flow stream while helping to minimize the pressure drop across the device and/or the amount of shear stress imparted to the flow stream. The layer multiplication device includes an insert housing that has an inlet configured to receive a flow stream, an outlet configured to discharge the flow stream, and a flow cavity extending between the inlet and the outlet. The layer multiplication device also includes a layer multiplication insert positioned within the flow cavity that is configured to divide the flow stream so as to multiply the flow stream. Depending on the configuration of the layer multiplication device, the device may be configured so that a cavity flow volume of the device is equal to or greater than an inlet flow volume of the device and/or a length normalized volume of a flow channel connected to the device. In such examples, the cavity flow volume is a free volume within the flow cavity of the insert housing through which a flow stream travels during operation, while the inlet flow volume is a defined volume equal to a cross-sectional area of the insert housing at the inlet multiplied by a length of the flow cavity.

To configure the layer multiplication device so that the cavity flow volume of the device is equal to or greater than an inlet flow volume, the insert housing is enlarged in the region where the layer multiplication insert is positioned relative to the inlet of the housing. The enlarged region accounts for space within the insert housing occupied by the layer multiplication insert. Accordingly, as a flow stream moves through the layer multiplication device, the flow stream has at least as much volume within the device as at the inlet of the device, even though the layer multiplication insert occupies space within the device. This configuration reduces the magnitude of shear forces generated in the device and pressure drop across the device, as compared to known layer multiplication devices that have a constricted flow cavity.

A layer multiplication device will be described in greater detail with respect to FIGS. 2-7. However, a system and method for manufacturing a multilayer film that includes a layer multiplication device will first be described with respect to FIG. 1.

FIG. 1 is a conceptual drawing illustrating a system 10, which is used to manufacture a multilayer film. System 10 includes a feed block 12, a layer multiplication device 14, and an extrusion die 16. Feed block 12 is connected to layer multiplication device 14 by a flow channel 22. Layer multiplication device 14 is connected to extrusion die 16 by a flow channel 24. Feed block 12 is configured to receive two flows of polymeric material to form the multilayer film which, in FIG. 1, is illustrated as a first polymeric material 18 and a second polymeric material 20. In operation, feed block 12 produces a primary multilayer flow stream that is conveyed through flow channel 22 to an inlet of layer multiplication device 14. The primary multilayer flow stream is divided within layer multiplication device 14 into multiple secondary flow streams which, in turn, are recombined to produce a multiplied flow stream that has more individual layers than the primary multilayer flow stream entering layer multiplication device 14. After discharging from layer multiplication device 14, the multiplied flow stream travels through flow channel 24 so that the flow stream can be extruded through extrusion die 16, cooling, and/or other processing can be performed on the flow stream to produce a multilayer film.

As described in greater detail below, layer multiplication device 14 includes an insert housing that defines an inlet configured to receive the primary multilayer flow stream from feed block 12, an outlet configured to discharge a multiplied flow stream from the device, and a flow cavity extending between the inlet and the outlet. Layer multiplication device 14 also includes at least one layer multiplication insert positioned within the flow cavity that is configured to divide the primary multilayer flow stream from feed block 12 so as to multiply the flow stream into at least a first flow stream and a second flow stream. In some examples, layer multiplication device 14 is configured to define a cavity flow volume that is equal to or greater than an inlet flow volume. For example, layer multiplication device 14 defines a cavity flow volume that is a free volume within the flow cavity of the insert housing through which the flow stream travels and an inlet flow volume that is equivalent to a cross-sectional area of the insert housing at the inlet multiplied by a length of the flow cavity. The free volume within the flow cavity of the layer multiplication device is equal to or greater than the volume at the inlet of the layer multiplication device. When so configured, the primary multilayer flow stream entering layer multiplication device 14 is divided into at least the first flow stream and the second flow stream in such a way that the first flow stream and the second flow stream have at least as much volume within the device to travel as the amount of volume occupied by the primary multilayer flow stream entering the device.

System 10 generates a primary multilayer flow stream in feed block 12. Feed block 12 receives the first polymeric material 18 and the second polymeric material 20 and processes the materials to form a multilayer flow stream that includes individual layers of both the first polymeric material and the second polymeric material. For example, feed block 12 receives the first polymeric material 18 and the second polymeric material 20 and orients the polymeric materials so as to form a plurality individual of layers, where each layer is formed of either first polymeric material 18 or second polymeric material 20. Feed block 12 further stacks each individual layer, one on top of another, to form the multilayer flow stream. The multilayer flow stream exiting feed block 12 is referred to as a primary multilayer flow stream.

The arrangement (e.g., size, composition, number) of the different individual layers in the primary multilayer flow stream exiting feed block 12 may vary, e.g., based on the design of the feed block and the number of different polymer materials supplied to the feed block. In some examples, each layer in the primary multilayer flow stream exiting feed block 12 is oriented generally parallel to all the other all individual layers in the multilayer flow stream. Each individual layer in the primary multilayer flow stream may have the same thickness as all the other layers in the primary multilayer flow stream, or at least one individual layer in the primary multilayer flow stream may have a thickness that is different than a thickness of at least one other layer in the primary multilayer flow stream. For example, at least some (and optionally all) of the individual layers in the primary multilayer flow stream formed of one type of polymeric material (e.g., first polymeric material 18) may have a thickness that is different than at least some (and optionally all) of the individual layers in the primary multilayer flow stream formed of a different type of polymeric material (e.g., second polymeric material 20).

In some examples, the primary multilayer flow stream includes at least one individual layer formed of each type of polymeric material supplied to feed block 12. In some additional examples, the primary multilayer flow stream includes only one individual layer formed of each type of polymeric material supplied to feed block 12. In system 10 of FIG. 1, for instance, the primary multilayer flow stream exiting feed block 12 has only two layers: one layer formed of first polymeric material 18 and one layer formed of second polymeric material 20. In other examples, the primary multilayer flow stream exiting feed block 12 may have multiple individual layers formed of one type of polymeric material (e.g., first polymeric material 18) and one or multiple individual layers formed of another type of polymeric material (e.g., second polymeric material 20).

Figure 2A:
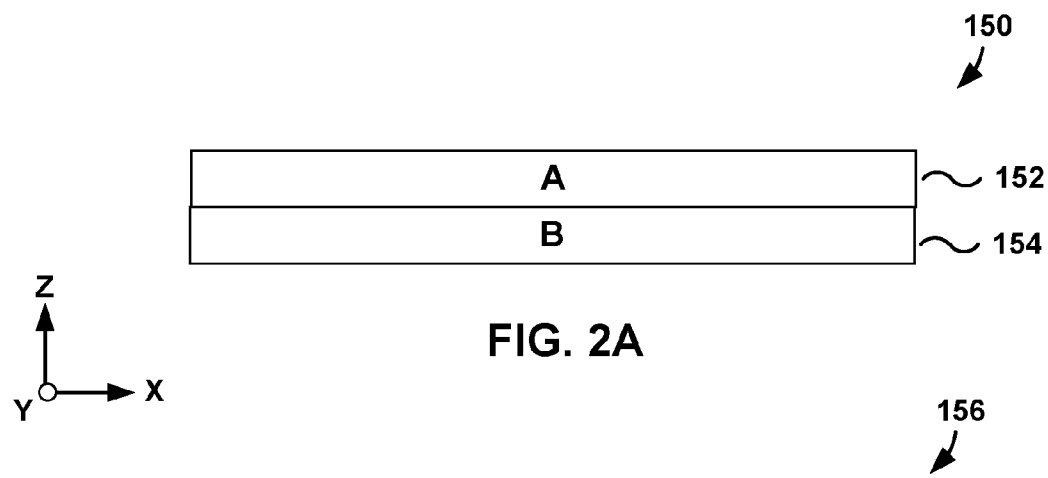
FIGS. 2A-2C are cross-sectional drawings illustrating example multilayer flow configurations that may be defined by a primary multilayer flow stream in the example system of FIG. 1.
Figure 2B:
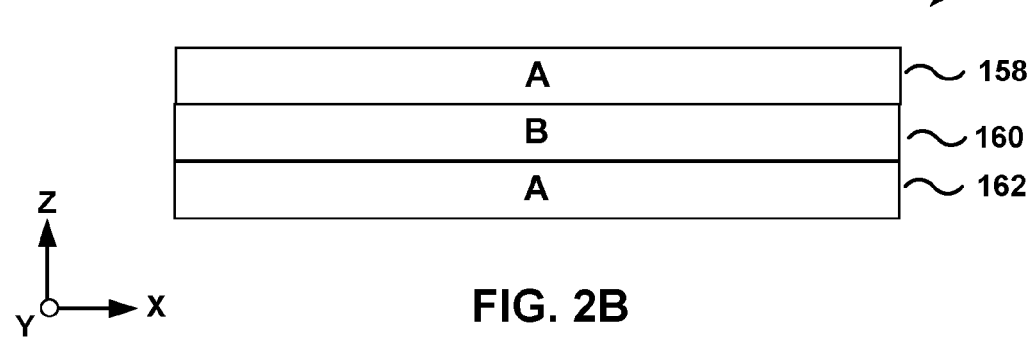
Figure 2C:
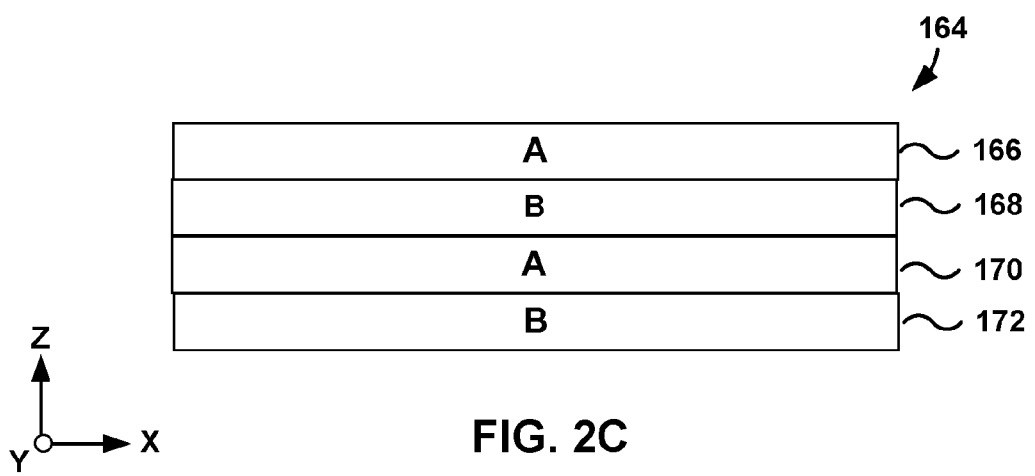

FIGS. 2A-2C are cross-sectional drawings illustrating example layer configurations that may be defined by the primary multilayer flow stream exiting feed block 12. Each individual layer in the layer stack is illustrated as having the same thickness and as being oriented generally parallel to all the other individual layers in the layer stack, although different thicknesses and/or orientations for each individual layer may be possible in practice. Further, for simplicity, different individual layers in the layer stack are designated as being formed of either material "A" (e.g., first polymeric material 18) or material "B" (e.g., second polymeric material 20).

FIG. 2A illustrates a primary flow stream 150 having a first individual layer 152 formed of material "A" and a second individual layer 154 formed of material "B." First individual layer 152 is stacked on top of second individual layer 154. In some examples, each individual layer in the primary multilayer flow stream exiting feed block 12 defines a discrete interface between each other individual layer in the primary multilayer flow stream. For example, each individual layer in the primary multilayer flow stream exiting feed block 12 is formed so that there is no intermixing of the material forming one individual layer with material forming adjacent individual layers. In other examples, each individual layer in the primary multilayer flow stream does not define a discrete interface between adjacent layers.

FIG. 2B illustrates another primary flow stream 156 having a first individual layer 158 formed of material "A," a second individual layer 160 formed of material "B," and a third individual layer 162 formed of material "A." First individual layer 158 is stacked on top of second individual layer 160 which, in turn, is stacked on top of third individual layer 162.

FIG. 2C illustrates a primary flow stream 164 having a first individual layer 166 formed of material "A," a second individual layer 168 formed of material "B," a third individual layer 170 formed of material "A," and a fourth individual layer 172 formed of material "B." First individual layer 166 is stacked on top of second individual layer 168, second individual layer 168 is stacked on top of third individual layer 170, and third individual layer 170 is stacked on top of fourth individual layer 172. In various examples, the primary multilayer flow stream exiting feed block 12 may include two, three, four, or more individual layers. The foregoing number and compositional arrangement of layers in a primary flow stream are merely examples however, and the disclosure is not limited in this respect.

With further reference to FIG. 1, in general, the primary multilayer flow stream exiting feed block 12 includes a plurality of individual layers, where each individual layer in the primary multilayer flow stream includes at least one (and, optionally, only one) of the plurality of polymeric materials supplied to feed block 12. Example polymeric materials that may be delivered to feed block 12 to form the primary multilayer flow stream include, but are not limited to, polyethylene (e.g., high-density, low-density, linear low-density), polypropylene, polyvinyl chloride, polystyrene, polyethylene terephthalate, ethylene vinyl alcohol, polyvinyl alcohol, polyvinylidene chloride, polyamides, polycarbonates, cellulosics, and combinations thereof. In addition, although in the example of FIG. 1 only two different polymeric materials are supplied to feed block 12, in other examples, fewer polymeric materials (e.g., one polymeric material) or more polymeric materials (e.g., three, four, or more different polymeric materials) may be supplied to the feed block, and the disclosure is not limited in the respect.

After exiting feed block 12, the primary multilayer flow stream in system 10 travels through flow channel 22 to layer multiplication device 14. Flow channel 22 may be a pipe, tube, or other conduit for conveying a multilayer flow stream. In some examples, flow channel 22 has a continuous cross-sectional area across the length of the channel between feed block 12 and layer multiplication device 14. Regardless, flow channel 22 conveys the primary multilayer flow stream from feed block 12 to layer multiplication device 14 for further processing as described herein. After discharging from layer multiplication device 14, a multiplied flow stream travels through flow channel 24 so that the flow stream can be extruded through extrusion die 16 or otherwise processed.

Figure 3:
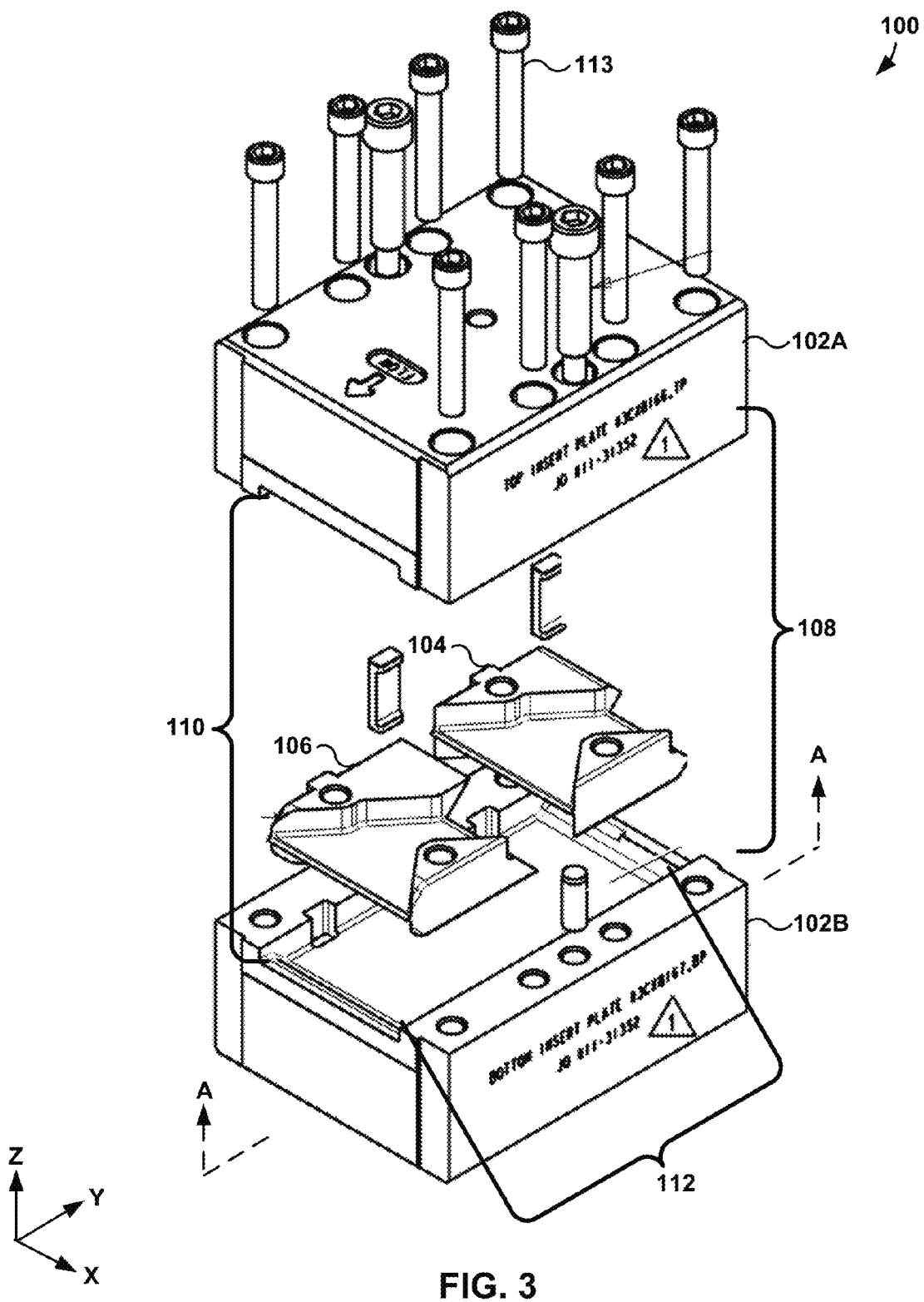
FIGS. 3 and 4 are perspective views of an example layer multiplication device that may be used in system of FIG. 1.
Figure 4:
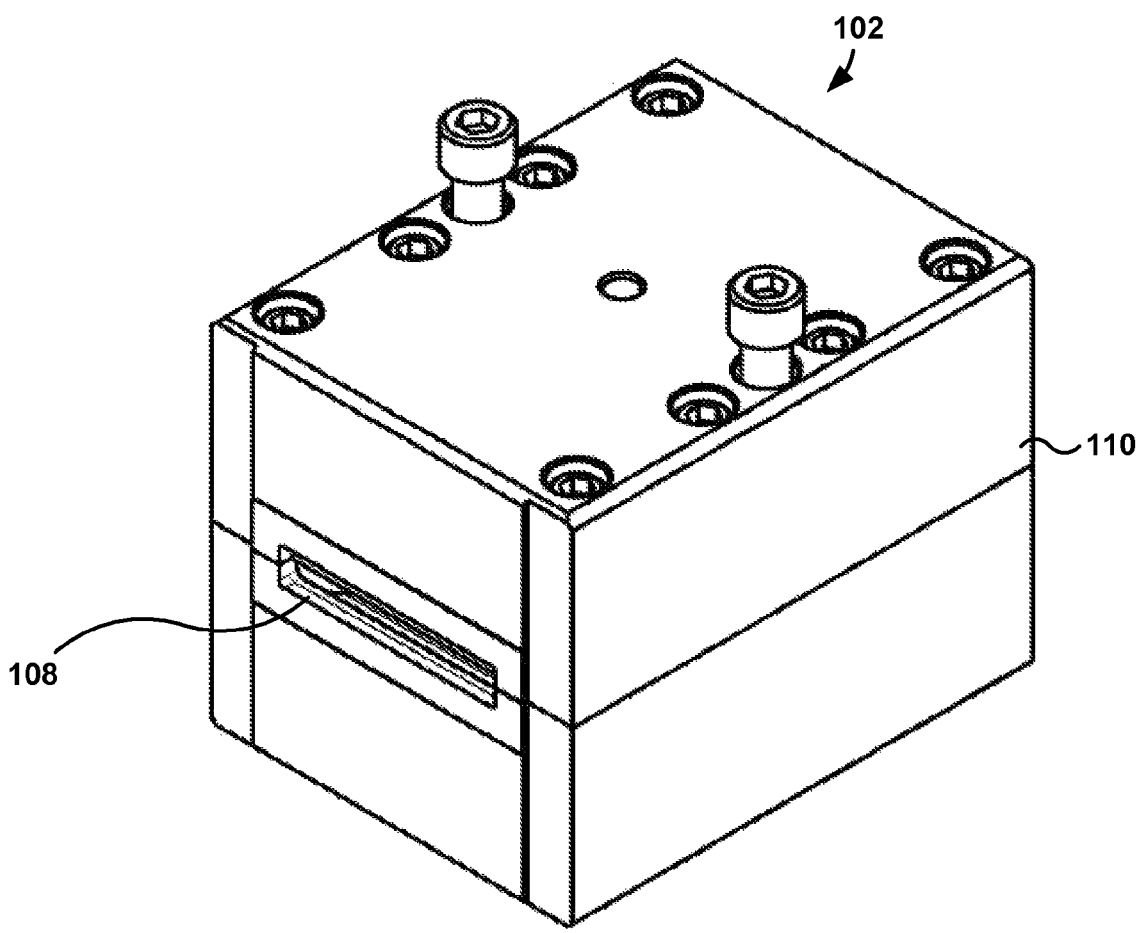

FIGS. 3 and 4 are perspective views of a layer multiplication device 100 that is used in system 10 of FIG. 1. FIG. 3 illustrates layer multiplication device 100 in an open configuration to show example features inside of the layer multiplication device while FIG. 4 illustrates layer multiplication device 100 in a closed configuration. Layer multiplication device 100 (also referred to herein as "device 100") includes an insert housing 102 and at least one layer multiplication insert 104 positioned inside of the insert housing which, in the example of FIG. 3, is illustrated as a first layer multiplication insert 104 and a second layer multiplication insert 106. Insert housing 102 has an inlet 108 that is configured to receive a multilayer flow stream (e.g., the primary multilayer flow stream exiting feed block 12 via flow channel 22 in FIG. 2) and an outlet 110 configured to discharge a multiplied multilayer flow stream. Inlet 108 is connected to a flow channel (e.g., flow channel 22 in FIG. 1), and outlet 110 is also connected to a flow channel (e.g., flow channel 24 in FIG. 1). Insert housing 102 also has a flow cavity 112 that extends between inlet 108 and outlet 110.

In operation, a multilayer flow stream enters insert housing 102 via inlet 108. Inside of inset housing 102, layer multiplication insert 104 divides the multilayer flow stream so as to multiply the multilayer flow stream into at least a first multilayer stream and a second multilayer stream. The first multilayer stream and the second multilayer stream may each be a lesser portion of the primary multilayer flow stream entering insert housing 102. For example, when layer multiplication insert 104 divides the primary multilayer flow stream into only a first multilayer stream and a second multilayer stream, the combined volume of the first multilayer stream and the second multilayer stream equals the volume of the primary multilayer flow stream entering the insert housing. In some examples, layer multiplication insert 104 also controls the movement of the divided first multilayer stream and second multilayer stream to recombine the streams, e.g., by stacking one stream on top of the other stream to form a multiplied multilayer flow stream. This multiplied multilayer flow stream, which can exit from insert housing 102 via outlet 110, has more individual layers than the primary multilayer flow stream entering the insert housing via inlet 108.

Insert housing 102 of device 100 holds layer multiplication insert 104. Insert housing 102 defines a bounded cavity (e.g., except for inlet 108 and outlet 110) that receives a primary multilayer flow stream and, in combination with layer multiplication insert 104, controls movement of the flow stream through the housing. In the example of FIGS. 3 and 4, insert housing 102 includes a first portion 102A and a second portion 102B (collectively "insert housing 102") that are mechanical connected via a plurality of bolts 113 so that the portions do not separate when a flow stream is passing through the housing. Insert housing 102 is accessed by removing the plurality of bolts 113 and separating first portion 102A from second portion 102B. Periodic access inside insert housing facilitates cleaning, replacement or removal of layer multiplication insert 104, or maintenance tasks. In other examples, other mechanical fixation features such as screws, welding, clamps, or the like may be used to mechanically attach first portion 102A and second portion 102B. In still other examples, insert housing 102 may not be openable but may instead be designed to remain closed during the service life of the housing. Therefore, although the housing of device 100 is described as an insert housing that is configured to receive and hold layer multiplication insert 104, is should be appreciated that layer multiplication insert 104 may or may not be removable from insert housing 102, and the disclosure is not limited in this respect.

Layer multiplication insert 104 is positioned within insert housing 102 and, in particular in the example of FIG. 3, within flow cavity 112 of insert housing 102. In general, flow cavity 112 is a region in insert housing 102 between inlet 108 and outlet 110 that holds that layer multiplication insert (or inserts, if more than one) of device 100 and through which flow streams travel during operation of the device. Inlet 108 is an opening in insert housing 102 through which a primary multilayer stream enters insert housing 102 during operation of device 100. For example, inlet 108 is a region extending from outside of insert housing 102 (e.g., starting at an external face of the housing) to inside of the insert housing (e.g., terminating at or before a leading edge of layer multiplication insert 104). In some examples, inlet 108 has a length equal to a thickness of a wall of insert housing 102 through which the inlet extends. Outlet 110 is an opening in insert housing 102 opposite inlet 108 through which a multiplied stream exits insert housing 102 during operation of device 100. In some examples, outlet 110 has a length equal to a thickness of a wall of insert housing 102 through which the outlet extends.

Figure 5:
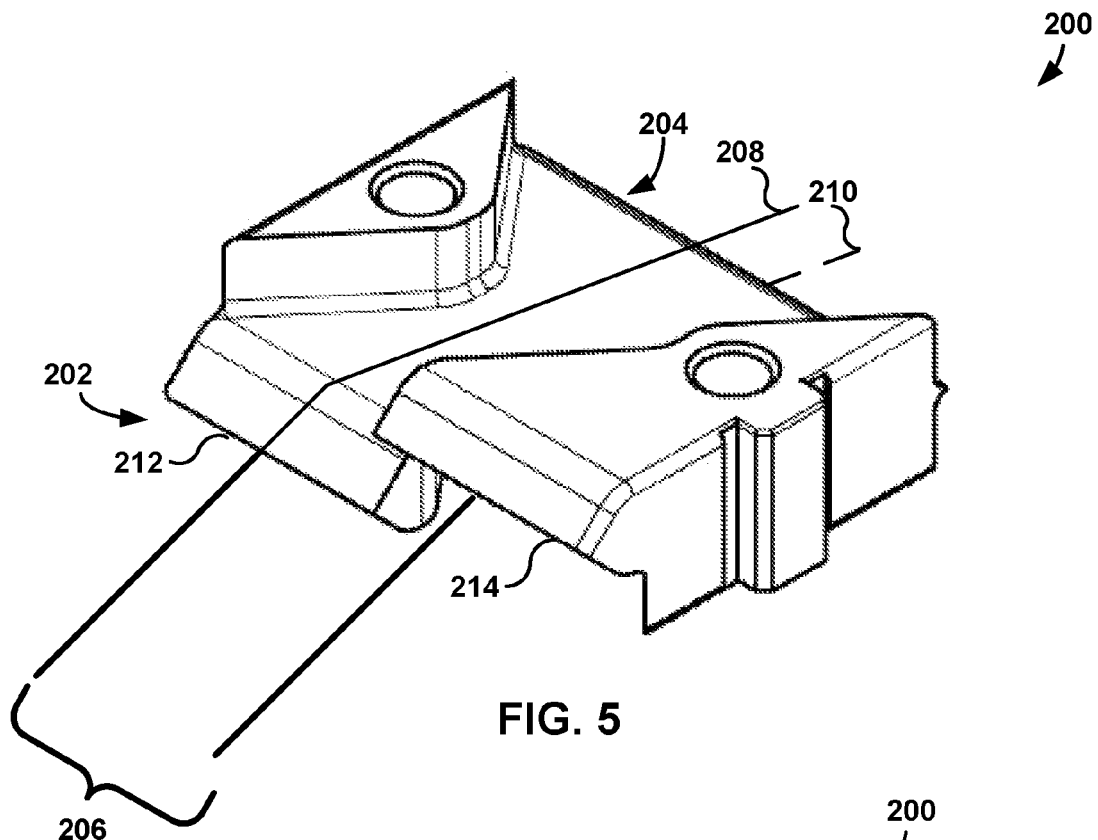
FIGS. 5 and 6 are front and back views, respectively, of an example layer multiplication insert that may be used in the example layer multiplication device of FIGS. 3 and 4.
Figure 6:
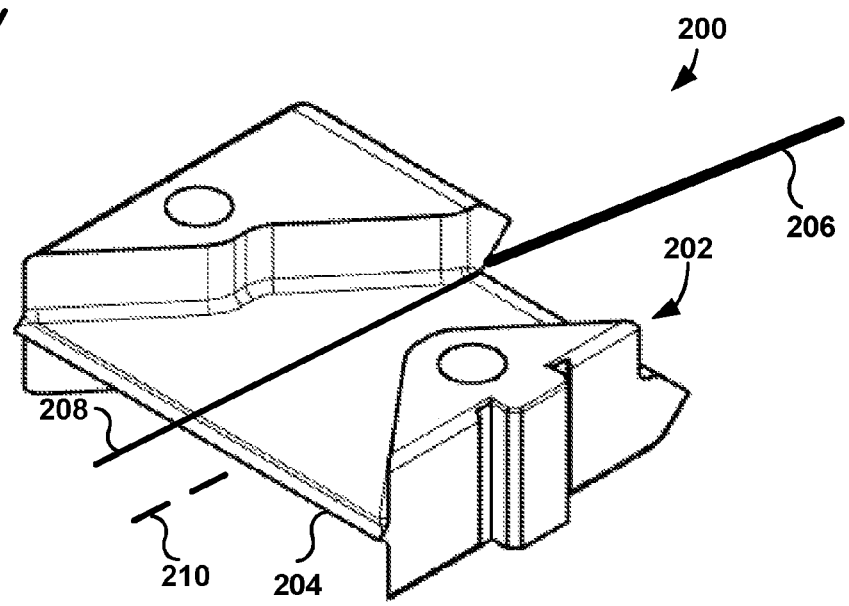

FIGS. 5 and 6 are front and back views, respectively, of a layer multiplication insert 200 that is used as first layer multiplication insert 104 and/or second layer multiplication insert 106 in device 100. Layer multiplication insert 200 extends from a leading edge 202 to a tailing edge 204. Leading edge 202 receives a primary multilayer flow stream 206 (which is shown divided before the layer multiplication insert only for purposes of illustration) and is configured to divide the stream into a first stream 208 and a second stream 210. First stream 208 passes on one side of layer multiplication insert 200 (e.g., between a surface of the layer multiplication insert and a surface of first portion 102A of insert housing 102) and second stream 210 passes on another side of layer multiplication insert 200 (e.g., between a surface of the layer multiplication insert and a surface of second portion 102B of insert housing 102). First stream 208 recombines with second stream 210 after passing trailing edge 204 of the layer multiplication insert. In particular, in the example of FIGS. 5 and 6, first stream 208 recombines with second stream 210 such that first stream 208 is vertically stacked on top of second stream 210.

Leading edge 202 of layer multiplication insert 200 is configured to divide primary multilayer flow stream 206 into at least two sub streams. For example, leading edge 202 of layer multiplication insert 200 divides primary multilayer flow stream 206 in a direction substantially orthogonal to the major plane of each individual layer in the primary multilayer flow stream. In examples in which primary multilayer flow stream 206 defines a plurality of individual layers where each layer is stacked vertically top of another (e.g., FIGS. 2A-2C), layer multiplication insert 14 splits the primary multilayer flow stream vertically (e.g., in the Z-direction indicated on FIGS. 2A-2C).

Leading edge of layer multiplication insert 200 in the example of FIGS. 5 and 6 includes a downwardly directed divider 212 and an upwardly directed divider 214. Downwardly directed divider 212 is positioned adjacent to and, in some examples, in contact with upwardly directed divider 214 in a side-by-side arrangement. When primary multilayer flow stream 206 contacts downwardly directed divider 212 and upwardly directed divider 214, the multilayer flow stream divides at the junction between the two dividers so that first flow stream 208 travels on one side of layer multiplication insert 200 and second stream 210 travels on an opposite side of the insert.

In operation, primary multilayer flow stream 206 flows towards downwardly directed divider 212 and upwardly directed divider 214 so that each individual layer in the multilayer flow stream is oriented in the plane of travel of the multilayer flow stream. In such examples, the number of individual layers in both first stream 208 and second stream 210 is equal to the number of individual layers in primary multilayer flow stream 206. Accordingly, when first stream 208 is recombined with second stream 210 by stacking first stream 208 on top of second stream 210, the resulting combined stream has twice as many layers as primary multilayer flow stream 206. For example, if primary multilayer flow stream 206 has three individual layers formed of polymers "A" and "B" to define an A-B-A flow stream, both first stream 208 and second stream 210 may also define three individual layers having an A-B-A compositional arrangement. In addition, when first stream 208 is stacked on top of second stream 210 at trailing edge 204 of the layer multiplication insert, the combined stream has six individual layers having an A-B-A-A-B-A compositional arrangement.

With further reference to FIG. 3, insert housing 102 is configured to receive at least one layer multiplication insert so that insert is positioned within flow cavity 112 of the housing. In some examples, insert housing 102 is configured (e.g., sized and/or shaped) to hold only one layer multiplication insert. In other examples, insert housing may be configured to hold multiple layer multiplication inserts. In the example of device 100, flow cavity 112 is configured to receive two layer multiplication inserts: first layer multiplication insert 104 and second layer multiplication insert 106. Second layer multiplication insert 106 is positioned in series (i.e., downstream) of first layer multiplication insert 104 within insert housing 102. During operation, first layer multiplication insert 104 divides an incoming multilayer flow stream into at least a first stream and a second stream and then recombines the first stream and second stream by stacking one stream on top of the other stream. Second layer multiplication insert 106 then divides this recombined stream into at least a third stream and a fourth stream and then recombines the third stream and fourth stream by stacking one stream on top of the other stream. In this manner, layer multiplication device 100 may produce a multiplied multilayer stream that has four times (4×) the number of individual layers as the primary multilayer stream entering the device.

In other examples in which insert housing 102 houses multiple layer multiplication inserts, a different number or different arrangement of layer multiplication inserts than illustrated in FIG. 3 may be used. In some examples, insert housing 102 is configured to hold multiple layer multiplication inserts in a vertically stacked arrangement (e.g., one on top of another) in addition to or in lieu of having multiple layer multiplication inserts positioned in series. Depending on the number and arrangement of the layer multiplication inserts in layer multiplication device 100, the layer multiplication device increases the number of individual layers in an incoming multilayer stream by a factor of 2×, 4×, 8×, 16×, or more. Additional layer multiplications may be achieved by using multiple layer multiplication devices positioned in series with one another.

As a multilayer flow stream moves through insert housing 102 during the operation of layer multiplication device 100, the mechanical action of dividing the multilayer flow stream and recombining divided streams to form a multiplied multilayer stream may introduce shear stress to the flowing streams of material. If the shear stress is too great, the physical structure of a multilayer film manufactured using device 100 may be damaged and/or different individual layers of the multilayer flow stream may blend together, which may cause at least a portion of the resulting film to lose its multilayer characteristics.

Device 100 is configured so that the volume of flow cavity 112 (e.g., a cavity flow volume) is sized equal or greater than an inlet flow volume of inlet 108 and/or a length normalized volume in a flow channel connected to the device. Layer multiplication device 100 defines a cavity flow volume that is a free volume within the flow cavity of insert housing 102 through which a multilayer flow stream travels and an inlet flow volume that is equivalent to a cross-sectional area of insert housing 102 at inlet 108 multiplied by a length of the flow cavity. The free volume within the flow cavity of the layer multiplication device is equal to or greater than the volume at the inlet of the layer multiplication device. The free volume within the flow cavity of the layer multiplication device, when normalized over an arbitrary length (e.g., per centimeter, per inch), is greater than or equal to a volume of a flow channel connected to the layer multiplication device, when the flow channel volume is normalized over the same arbitrary length. When so configured, the primary multilayer flow stream entering layer multiplication device 100 divides into at least a first flow stream and a second flow stream in such a way that the first flow stream and the second flow stream have at least as much volume within the device to travel as the amount of volume occupied by the primary multilayer flow stream entering the device.

Instead of reducing the amount of space within insert housing 102 for multilayered flows to travel, e.g., due to the physical space occupied by layer multiplication inserts 104 and 106, insert housing 102 provides at least as much space inside the housing as at the inlet of the housing for multilayered flows to travel. By maintaining or expanding the amount of flow volume available for multilayered flows to travel along the length of insert housing 102 (e.g., from inlet 108 to outlet 110), the amount of shear stress imparted to flows and/or the magnitude of pressure drop across device 100 is reduced as compared to when insert housing 102 reduces the amount of flow volume available for multilayered flows to travel along the length of insert housing 102.

Figure 7:
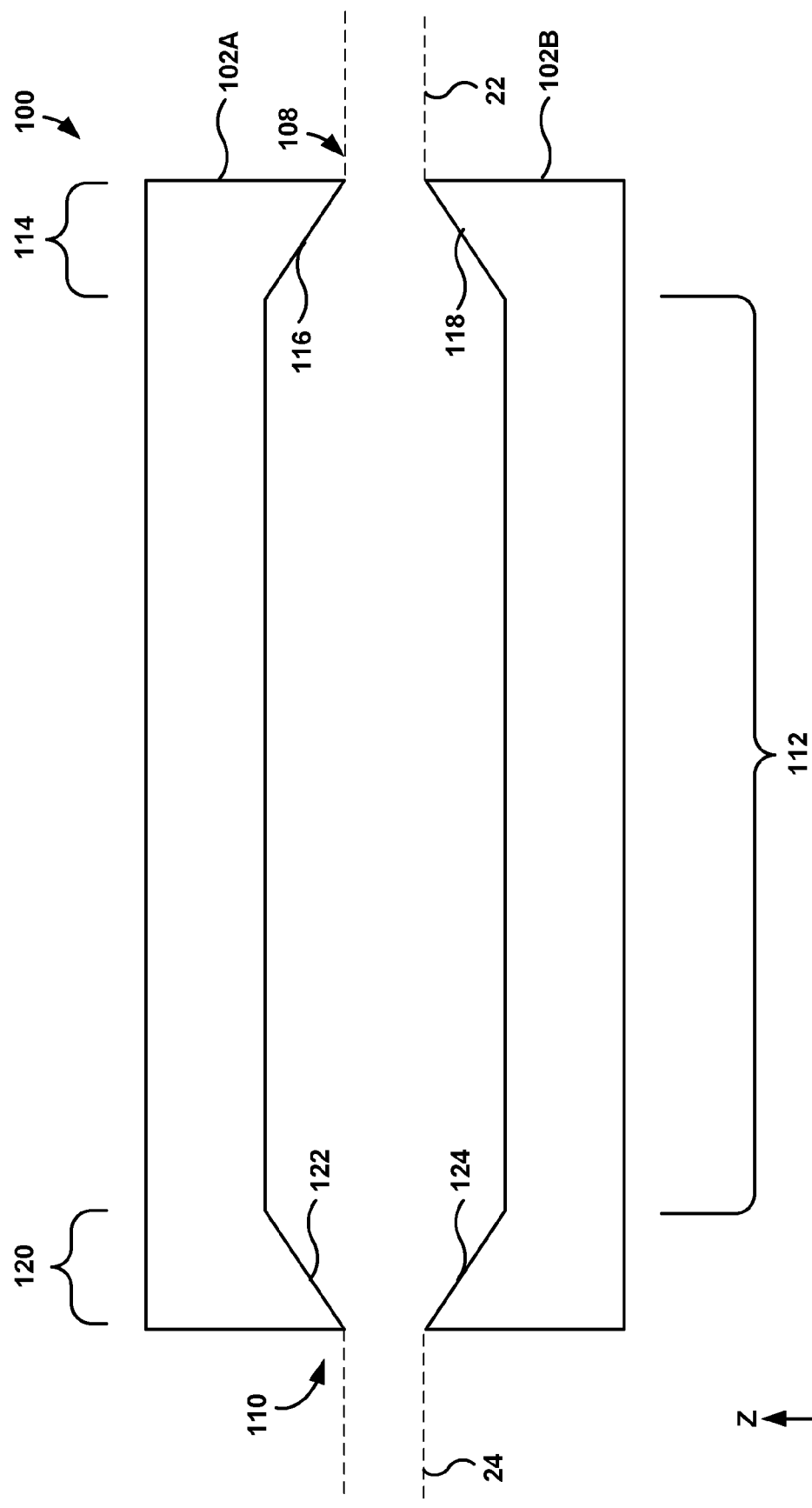
FIG. 7 is an example cross-sectional view of the layer multiplication device of FIG. 3, taken along the A-A cross-section line indicated on FIG. 3.

FIG. 7 is a cross-sectional view of insert housing 102 taken along the A-A cross-section line indicated on FIG. 3, shown without first layer multiplication insert 104 or second layer multiplication insert 106 positioned in the housing for purposes of illustration. As shown, insert housing 102 defines inlet 108 that is configured to receive a multilayer flow stream and outlet 110 that is configured to discharge a multiplied multilayer flow stream. Insert housing 102 also defines flow cavity 112 extending between inlet 108 and outlet 110.

In operation, a primary multilayered flow stream enters insert housing 102 via inlet 108 and flow channel 22 and travels through flow cavity 112 before exiting device 100. The space within flow cavity 112 through which multilayered flow streams can travel is referred to as a flow cavity volume. For example, flow cavity 112 defines a flow cavity volume that is the total volume of space within flow cavity 112 (e.g., from the start to the end of the flow cavity) through which flow streams travel (e.g., the space within insert housing 102 not occupied by layer multiplication inserts). When one or more layer multiplication inserts are positioned within flow cavity 112, the flow streams need to travel around and past the layer multiplication inserts before exiting out of device 100. Accordingly, the volume of space occupied by the layer multiplication inserts themselves in flow cavity 112 may reduce the volume of space within the flow cavity through which a flow stream travels.

The flow cavity volume defined by flow cavity 112 may be determined by multiplying a length of flow cavity 112 (e.g., in the Y direction indicated on FIG. 7) by a width and a height of the flow cavity and then subtracting the volume of space occupied by the layer multiplication inserts in the flow cavity. Although the relative dimensions of insert housing 102 can vary, in some examples, flow cavity 112 of insert housing 102 defines a larger width (e.g., X-direction indicated on FIG. 7) and/or height (e.g., in the Z-direction indicated on FIG. 7) than defined by inlet 108 and/or flow channel 22. Configuring flow cavity 112 so that the flow cavity has a larger width and/or height than inlet 108 and/or flow channel 22 increases the volume of space within the flow cavity through which a flow stream travels which, in turn, reduces the amount of shear stress on the flow stream.

In the example of FIG. 7, insert housing 102 defines a sloped transition region 114 between inlet 108 and flow cavity 112. Sloped transition region 114 is formed by a surface 116 of first housing portion 102A and a surface 118 of second housing portion 102B that each slope away from inlet 108. In some examples, surface 116 and surface 118 slope at an angle greater than 15 degrees such as, e.g., an angle greater than 30 degrees or an angle between approximately 30 degrees and approximately 60 degrees. Sloped transition region 114 enlarges the height of flow cavity 112 (e.g., in the Z-direction indicated on FIG. 7) relative to inlet 108. This is useful where device 100 is attached to an upstream flow channel 22 that has a smaller cross-sectional area than the cross-sectional area of flow cavity 112.

Although first housing portion 102A and second housing portion 102B in the example of FIG. 7 each slope away from inlet 108, in other examples, only one of the first housing portion 102A or the second housing portion 102B may slope away from inlet 108. In still other examples, insert housing 102 may not include a sloped transition region but may instead define a step between inlet 108 and flow cavity 112 or may not have any transition between the inlet and the flow cavity.

In some examples, such as examples in which insert housing 102 defines a sloped transition region between inlet 108 and flow cavity 112, insert housing 102 defines a sloped transition region between the flow cavity and outlet 110. In the example of FIG. 7, insert housing 102 defines an outlet sloped transition region 120. Outlet sloped transition region 120 is formed by a surface 122 of first housing portion 102A and a surface 124 of second housing portion 102B that each slope toward outlet 110. In some examples, surface 122 and surface 124 slope at an angle greater than 15 degrees such as, e.g., an angle greater than 30 degrees or an angle between approximately 30 degrees and approximately 60 degrees. Outlet sloped transition region 120 reduces the height of flow cavity 112 (e.g., in the Z-direction indicated on FIG. 7) relative to outlet 110. This is useful where device 100 is attached to a downstream flow channel 24 that has a smaller cross-sectional area that the cross-sectional area of flow cavity 112. For example, device 100 may be attached to upstream and downstream flow channels that each have the same cross-sectional area and that each have a cross-sectional area less than that of flow cavity 112.

When insert housing 102 is configured with a sloped transition region 114 and/or an outlet sloped transition region 120, the layer multiplication insert that is positioned within the housing may have a corresponding transition region(s) that mates with the transition region(s) of the insert housing. For example, when inset housing 102 is so configured, the layer multiplication insert has a leading edge (e.g., leading edge 202 in FIG. 5) that is configured to mate with sloped transition region 114 and/or a tailing edge (e.g., tailing edge 204 in FIG. 5) that is configured to mate with outlet sloped transition region 120. The layer multiplication insert is configured to mate with a transition region in that the insert may have a leading edge and/or tailing edge that is sloped at an angle corresponding to (e.g., equal to) the slope of the transition regions in the insert housing. In some examples, the layer multiplication insert mates with a transition region of insert housing 102 such that the leading edge and/or tailing edge of the insert is flush to and in contact with the slope of the transition of the insert housing.

Independent of whether insert housing 102 defines a sloped transition region or outlet sloped transition region, in some examples, device 100 is configured so that the cavity flow volume of flow cavity 112 is sized relative to a flow channel to which the device is connected. Sizing flow cavity 112 relative to an upstream flow channel helps reduce shear forces within the device during operation.

For example, flow cavity 112 can be sized to define a cavity flow volume that is at least equal to or even larger than a volume of flow channel 22 to which the flow cavity is connected. The flow channel volume is the volume in flow channel 22 through which a multilayer flow stream travels between an upstream feed block and layer multiplication device 100. Because flow channel 22 is relatively long, thus increasing the overall volume of the flow channel, the total cavity flow volume of flow cavity 112 and the total flow channel volume of flow channel 22 are normalized by some arbitrary length (e.g., per centimeter, per inch). Accordingly, the term "normalized cavity flow volume" as used herein means a volume of space within flow cavity 112 per unit of length. Further, the term "flow channel volume" as used herein means a volume of space in flow channel 22 through which the multilayer flow stream travels per unit of length. When the normalized cavity flow volume of flow cavity 112 is equal to or greater than the normalized flow channel volume of flow channel 22, flow streams within device 100 have at least as much space within insert housing 102 to flow as within the channel leading up to the device. Such a configuration may minimize the amount of shear stress imparted to flow streams within device 100.

In some examples, the normalized cavity flow volume of insert housing 102 is sized to be equal to the normalized flow channel volume of flow channel 22. In other examples, the normalized cavity flow volume of insert housing 102 is sized to be greater than the normalized flow channel volume of flow channel 22. For example, the normalized cavity flow volume of insert housing 102 may be at least 1% greater than the normalized flow channel volume of flow channel 22 such as, e.g., at least 5% greater, at least 10% greater, or at least 25% greater.

In addition to or in lieu of defining a cavity flow volume, insert housing 102 may have an inlet flow volume. The inlet flow volume of insert housing 102 represents a volume of space at the inlet of the insert housing through which a primary multilayer flow stream travels. In some examples, inlet 108 of insert housing 102 is sized (e.g., has a cross-sectional area) that is at least as large as or is the size same as a flow channel (e.g., flow channel 22 in FIG. 1) connecting device 100 to an upstream feed block. Accordingly, in these examples, the inlet flow volume of insert housing 102 represents a volume of space in a flow channel intended to connect device 100 to an upstream feed block, even when the device is not connected to the flow channel.

In accordance with examples of the present disclosure, insert housing 102 of device 100 is configured so that the cavity flow volume of the insert housing is sized relative to the inlet flow volume of the insert housing. Depending on the configuration, sizing flow cavity 112 relative an inlet flow volume helps reduce shear forces within the device during operation.

In some examples, flow cavity 112 may be sized to define a cavity flow volume that is at least equal to or even larger than an inlet flow volume of the device. The inlet flow volume of insert housing 102 is determined by multiplying a cross-sectional area of inlet 108 (e.g., in the X-Z plane indicated on FIG. 7) by a length of flow cavity 112. The length of flow cavity 112 used to determine this inlet flow volume is the same length used to determine the cavity flow volume of flow cavity 112. Accordingly, in such a situation, the inlet flow volume and cavity flow volume are both normalized to the length of the flow cavity.

When the cavity flow volume of flow cavity 112 is sized to be equal to or greater than the inlet flow volume of insert housing 102, flow streams within device 100 have at least as much space within insert housing 102 to flow as at the inlet of the housing. This configuration prevents flows from constricting within insert housing 102, which may cause shear stress.

In some examples, the cavity flow volume of insert housing 102 is sized to be equal to the inlet flow volume of the insert housing. In other examples, the cavity flow volume of insert housing 102 is sized to be greater than the inlet flow volume of the insert housing. For example, the cavity flow volume of insert housing 102 may be at least 1% greater than the inlet flow volume of the insert housing such as, e.g., at least 5% greater, at least 10% greater, or at least 25% greater.

Various examples have been described. These and other examples are within the scope of the following claims.

The invention claimed is:

1. A layer multiplication device comprising a housing and at least one layer multiplication insert,
    said housing having an inlet configured to receive a flow stream, an outlet configured to discharge the flow stream, and a flow cavity extending between said inlet and said outlet, and
    said at least one layer multiplication insert positioned within said flow cavity, said layer multiplication insert being configured to divide the flow stream into at least a first flow stream and a second flow stream and recombine the first flow stream and the second flow stream by stacking the first flow stream on top of the second flow stream,
    wherein said inlet has an inlet flow volume equivalent to a cross-sectional area of said housing at said inlet multiplied by a length of said flow cavity, said flow cavity has a cavity flow volume equal to or greater than said inlet flow volume, and said cavity flow volume is a free volume.

2. The layer multiplication device of claim 1, wherein said housing has a sloped transition surface between said inlet and said flow cavity, said sloped transition surface enlarging said flow cavity relative to said inlet so that said cavity flow volume is equal to or greater than said inlet flow volume.

3. The layer multiplication device of claim 2, wherein said at least one layer multiplication insert has a first side, a second side opposite said first side, a leading edge, and a trailing edge, said leading edge of said layer multiplication insert defines a downwardly directed divider and an adjacent upwardly directed divider, said downwardly directed divider is configured to direct the first flow stream on said first side of said layer multiplication insert and said upwardly directed divider is configured to direct the second flow stream on said second side of said layer multiplication insert.

4. The layer multiplication device of claim 3, wherein at least one of said downwardly directed divider and said upwardly directed divider has a sloped leading edge configured to mate with said sloped transition surface of said housing.

5. The layer multiplication device of claim 1, wherein said housing comprises a first portion and a second portion, and said first portion is configured to be mechanically attached to said second portion so as to sandwich said at least one layer multiplication insert between said first portion and said second portion.

6. A system comprising a feed block, a layer multiplication device, and a flow channel,
   said feed block configured to receive a plurality of polymeric flows and discharge a primary multilayer flow stream having a plurality of layers, each layer of the primary multilayer flow stream including one of the plurality of polymeric flows;
   said layer multiplication device including a housing and at least one layer multiplication insert positioned within said housing, wherein said housing has an inlet configured to receive the primary multilayer flow stream, an outlet configured to discharge a multiplied multilayer flow stream, and a flow cavity extending between said inlet and said outlet, and wherein said layer multiplication insert is configured to divide the primary multilayer flow stream into at least a first multilayer flow stream and a second multilayer flow stream and recombine the first multilayer flow stream and the second multilayer flow stream by stacking the first multilayer flow stream on top of the second multilayer flow stream; and
   said flow channel connecting said feed block to said inlet of said housing,
   wherein said flow channel has a flow channel volume equal to a volume of space in the flow channel through which the primary multilayer flow stream travels per unit of length, said flow cavity of said housing has a cavity flow volume, said cavity flow volume is equal to or greater than said flow channel volume, and said cavity flow volume is a free volume.

7. The system of claim 6, wherein said housing has a sloped transition surface between said inlet and said flow cavity, said sloped transition surface enlarging said flow cavity relative to said inlet so that said cavity flow volume is equal to or greater than said flow channel volume.

8. The system of claim 7, wherein said at least one layer multiplication insert has a first side, a second side opposite said first side, a leading edge, and a trailing edge, said leading edge of said layer multiplication insert defines a downwardly directed divider and an adjacent upwardly directed divider, said downwardly directed divider is configured to direct the first multilayer flow stream on said first side of said layer multiplication insert and said upwardly directed divider is configured to direct the second multilayer flow stream on said second side of said layer multiplication insert.

9. The system of claim 8, wherein at least one of said downwardly directed divider and said upwardly directed divider has a sloped leading edge configured to mate with said sloped transition surface of said housing.

10. The system of claim 6, further comprising an extrusion die positioned downstream of said layer multiplication device and a flow channel connecting said outlet to said extrusion die.

11. A method of multiplying a multilayer flow stream using a flow channel and a layer multiplication device with a flow cavity, the method comprising:
   conveying said primary multilayer flow stream through the flow channel, wherein the flow channel has a flow channel volume;
   receiving said primary multilayer flow stream from the flow channel in the flow cavity which has a cavity flow volume equal to or greater than the flow channel volume, said cavity flow volume being a free volume;
   dividing said primary multilayer flow stream into at least a first multilayer flow stream and a second multilayer flow stream; and
   recombining said first multilayer flow stream and said second multilayer flow stream inside the layer multiplication device by stacking said first multilayer flow stream on top of said second multilayer flow stream.

* * * * *